United States Patent
Eldally

(10) Patent No.: US 7,036,392 B2
(45) Date of Patent: May 2, 2006

(54) TRANSMISSION SYSTEM HAVING A GEAR WITH ENGAGING AND NON-ENGAGING SEMI-ANNULAR SECTIONS

(75) Inventor: Sherif Eldally, Pico Rivera, CA (US)

(73) Assignee: Sherif Eldally, Pico Rivera, CA (US)

( * ) Notice: Subject to any disclaimer, the term of this patent is extended or adjusted under 35 U.S.C. 154(b) by 0 days.

(21) Appl. No.: 10/733,070

(22) Filed: Dec. 11, 2003

(65) Prior Publication Data

US 2004/0118235 A1    Jun. 24, 2004

Related U.S. Application Data

(60) Provisional application No. 60/433,395, filed on Dec. 13, 2002.

(51) Int. Cl.
*F16H 55/17* (2006.01)

(52) U.S. Cl. .................. 74/437; 74/457; 74/665 F; 74/665 H

(58) Field of Classification Search ............. 74/412 R, 74/416, 417, 436, 431, 437, 457, 665 F, 665 H
See application file for complete search history.

(56) References Cited

U.S. PATENT DOCUMENTS

| 2,033,850 | A | * | 3/1936 | Roberts, Jr. | 74/351 |
| 4,019,405 | A | * | 4/1977 | Winter et al. | 74/344 |
| 5,178,028 | A | * | 1/1993 | Bossler, Jr. | 74/416 |
| 6,158,296 | A | * | 12/2000 | Denance | 74/351 |

FOREIGN PATENT DOCUMENTS

| EP | 0461534 A1 | * | 12/1991 |
| GB | 2263953 A | * | 8/1993 |

* cited by examiner

*Primary Examiner*—David Fenstermacher
(74) *Attorney, Agent, or Firm*—Crowell & Moring LLP

(57) ABSTRACT

A transmission system including a first gear comprising a first side having an engaging semi-annular section and a non-engaging semi-annular section; and a plurality of engaging gears for engaging with the engaging semi-annular section, wherein the engaging gears are configured such that at least one of the engaging gears is engaged to the engaging semi-annular section of the first gear at a particular angular orientation of the first gear, and at least one of the engaging gears is not engaged to the engaging semi-annular section at the particular angular orientation of the first gear.

40 Claims, 14 Drawing Sheets

Helix Angle

TRANSMISSION SYSTEM HAVING A GEAR WITH ENGAGING AND NON-ENGAGING SEMI-ANNULAR SECTIONS

CROSS-REFERENCE TO A RELATED APPLICATION

This application claims the benefit of the filing date of Provisional Patent Application Ser. No. 60/433,395, filed on Dec. 13, 2002, and entitled "Voluntary Gear Transmission," which is incorporated herein by reference.

FIELD OF THE INVENTION

This invention relates generally to gear transmission systems, and in particular, to a gear transmission system comprising a gear including a coupling side having an engaging semi-annular section for engaging with a plurality of gears respectively at distinct angular positions, and a non-engaging semi-annular section for not engaging with any of the plurality of gears.

BACKGROUND OF THE INVENTION

Gear transmission systems typically include two or more gears rotationally engaged with each other. In order for two gears to be properly engaged with each other, the gears should have substantially the same diametral pitch. The diametral pitch is a measure of the angular distance between adjacent teeth of a gear. The diametral pitch is typically represented as the ratio of the number of teeth to the diameter of the gear. This concept will be further explained with reference to FIG. 1.

FIG. 1 illustrates an exemplary gear transmission system 100 to illustrate a general concept of the pertinent art. The gear transmission system 100 consists of a first gear 110 rotationally engaged with a second gear 120. The first gear 110 has a diameter $D_1$ and $N_1$ number of teeth 112. The second gear 120 has a diameter $D_2$ and $N_2$ number of teeth 122. In this example, the diameter $D_1$ of the first gear 110 is larger than the diameter $D_2$ of the second gear 120.

As previously discussed, in order for the first and second gears 110 and 120 to rotationally engage properly, the diametral pitch of the first gear 110 should be substantially the same as the diametral pitch of the second gear 120. The diametral pitch is the ratio of the number of teeth to the diameter of the gear. Accordingly, the following relationship holds:

$$\frac{N_1}{D_1} \cong \frac{N_2}{D_2} \qquad \text{Equation 1}$$

Such a gear transmission system 100 operates well as long as the diametral pitches of the first and second gears 110 and 120 remain fixed and substantially the same.

However, there may be gear transmission systems that require the movement of such gears in a manner that causes the diametral pitches of engaging gears to depart from the relationship given in Equation 1. Such a system is described with reference to FIG. 2.

FIG. 2 illustrates another exemplary gear transmission system 200 to illustrate a problem to be solved by the invention. The gear transmission system 200 consists of a first gear 210 rotationally engaged with a second gear 220. In this example, the first gear 210 rotates about a rotational axis substantially orthogonal to the rotational axis of the second gear 220. Also in this example, the second gear 220 is required to move radially with respect to the first gear 210 such that the teeth 222 of the second gear 220 can engage with a set of teeth 212 situated along a relatively small circumference of the first gear 210 and with another set of teeth 214 situated along a relatively larger circumference of the first gear 210.

This movement 230 has the effect of changing the gear ratio of the first and second gears 210 and 220, which may be a requirement of many transmission systems. In this example, the first gear is shown to have two sets of teeth 212 and 214. However, it shall be understood that the first gear 210 may have many sets of teeth situated at various circumferences between sets 212 and 214. This allows the gradual change of the gear ratio of the first and second gears 210 and 220.

A problem with this system 200 has to do with the diametral pitch requirement for the first gear 210 to rotationally engage properly with the second gear 220 at all of the sets of teeth from the inner teeth set 212 to the outer teeth set 214. As previously discussed, in order for engaging gears to rotate properly with each other, the diametral pitches of the gears should be substantially the same. In this example, the diametral pitch of the second gear 220 should be substantially the same as the diametral pitch corresponding to the sets of teeth 212 and 214 of the first gear 210. Accordingly, the following relationship holds:

$$\frac{N_3}{D_3} \cong \frac{N_4}{D_4} \cong \frac{N_5}{D_5} \qquad \text{Equation 2}$$

Because the diameter $D_3$ of the inner teeth set 212 is smaller than the diameter $D_4$ of the outer teeth set 214, the number of teeth $N_3$ of the inner teeth set 212 should be smaller than the number of teeth $N_4$ of the outer teeth set 214 in order for Equation 2 to hold. If there are plurality of circumferential teeth sets between the inner and outer teeth sets 212 and 214, then the number of teeth for those sets increases with their circumferences according to Equation 2. Because of the varying quantities of teeth for the various sets, it is difficult to align the teeth in the radial direction throughout the entire circumference in order to provide a path 230 in which the second gear 230 could rotate freely substantially without interference or backlash.

DETAILED DESCRIPTION OF THE INVENTION

A general concept of the invention is that the various sets of circumferentially-arranged teeth of a primary gear can be aligned to provide an area substantially free from interference and backlash for a semi-annular section having an angular distance less than 360 degrees. The remaining semi-annular section will not be aligned, and therefore do not provide an engagement area substantially free from interference and backlashes. Accordingly, a concept of the invention is to remove semi-annular section that does not have aligned sets of circumferentially-arranged teeth, and to use multiple engaging gears to engage with the semi-annular section having aligned sets of teeth in order to provide continue engagement throughout an entire rotation of the primary gear. This concept will be further explained with reference to FIGS. 3A–3D. And it would be explained later the effect of recessing the non-aligned teeth on radial gear movement.

Figure 1:
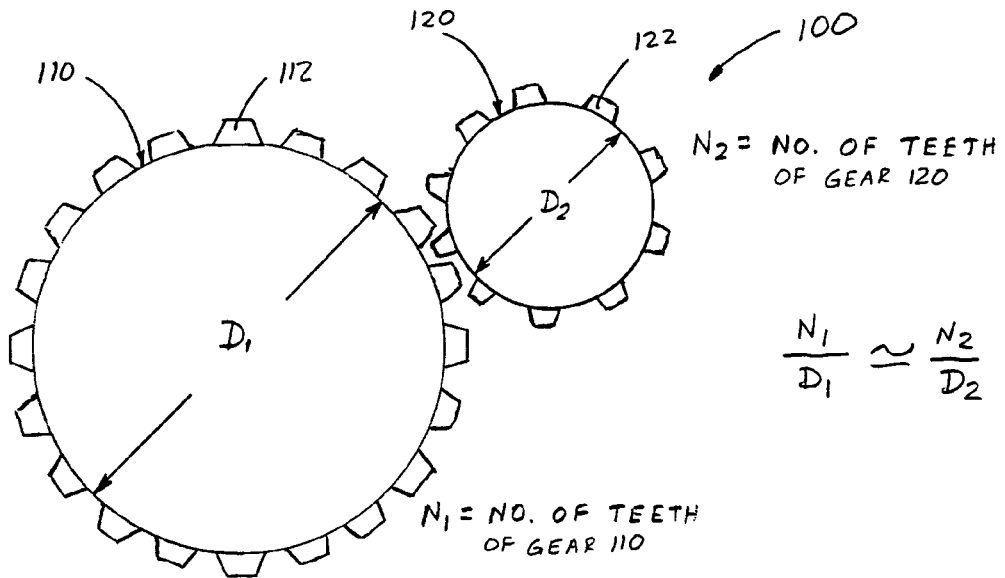
FIG. 1 illustrates an exemplary gear transmission system to illustrate a general concept of the pertinent art.
Figure 2:
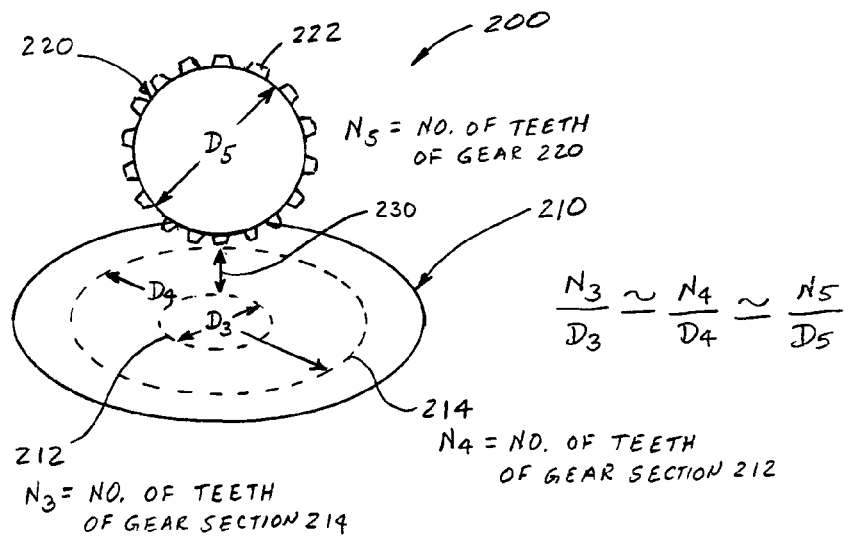
FIG. 2 illustrates another exemplary gear transmission system to illustrate a problem to be solved by embodiments of the invention.
Figure 3A:
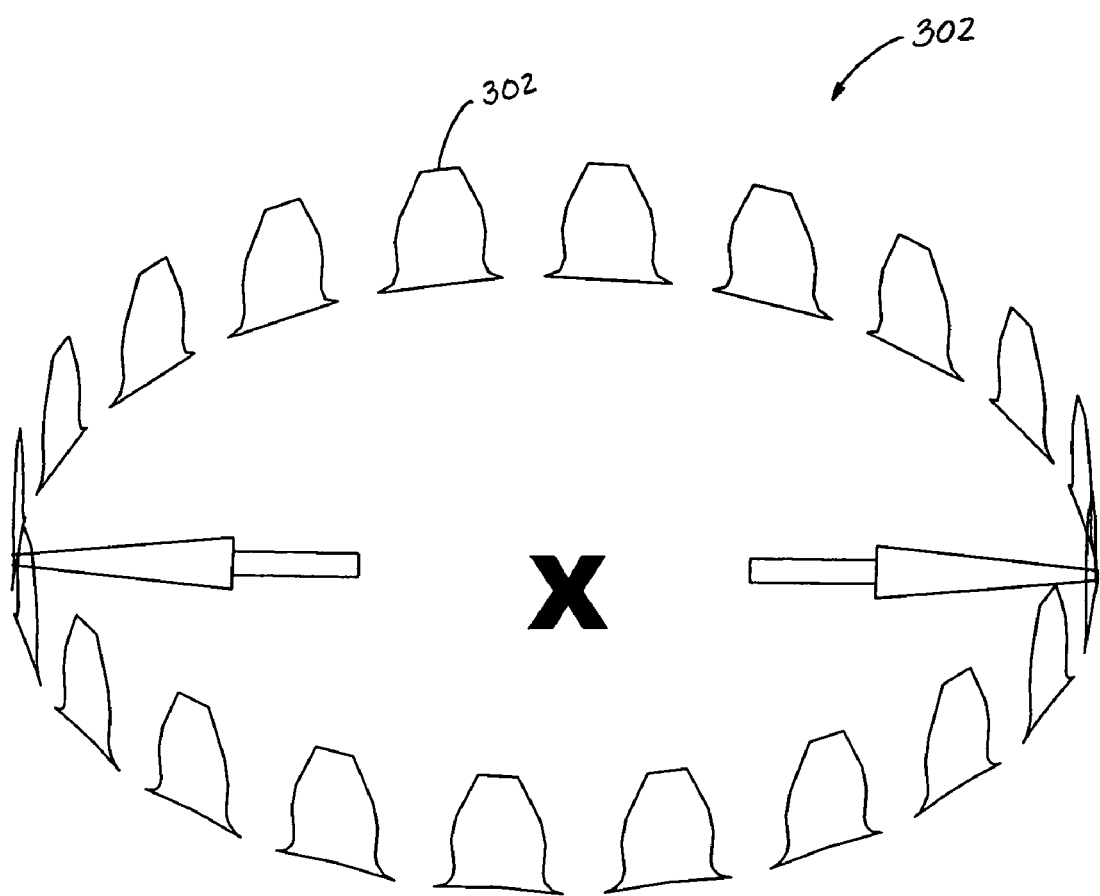
FIGS. 3A–3D illustrate perspective diagrams of an exemplary gear having varying sets of circumferential teeth in accordance with an embodiment of the invention.

FIG. 3A illustrates a perspective diagram of an exemplary gear 300 having an inner set of circumferentially-arranged teeth 302 in accordance with an embodiment of the invention. In this example, the inner set of circumferentially-arranged teeth 302 has a diameter of X. The diameter X, in this example, is the smallest of the diameters of the remaining sets of circumferentially-arranged teeth to be discussed with reference to FIGS. 3B–3D. Also, this teeth set 302 is shown to have 20 teeth. Accordingly, the diametral pitch of teeth set 302 is given by the following:

$$\text{Diametral Pitch (teeth set 302)} \cong \frac{20}{X} \quad \text{Equation 3}$$

Figure 3B:
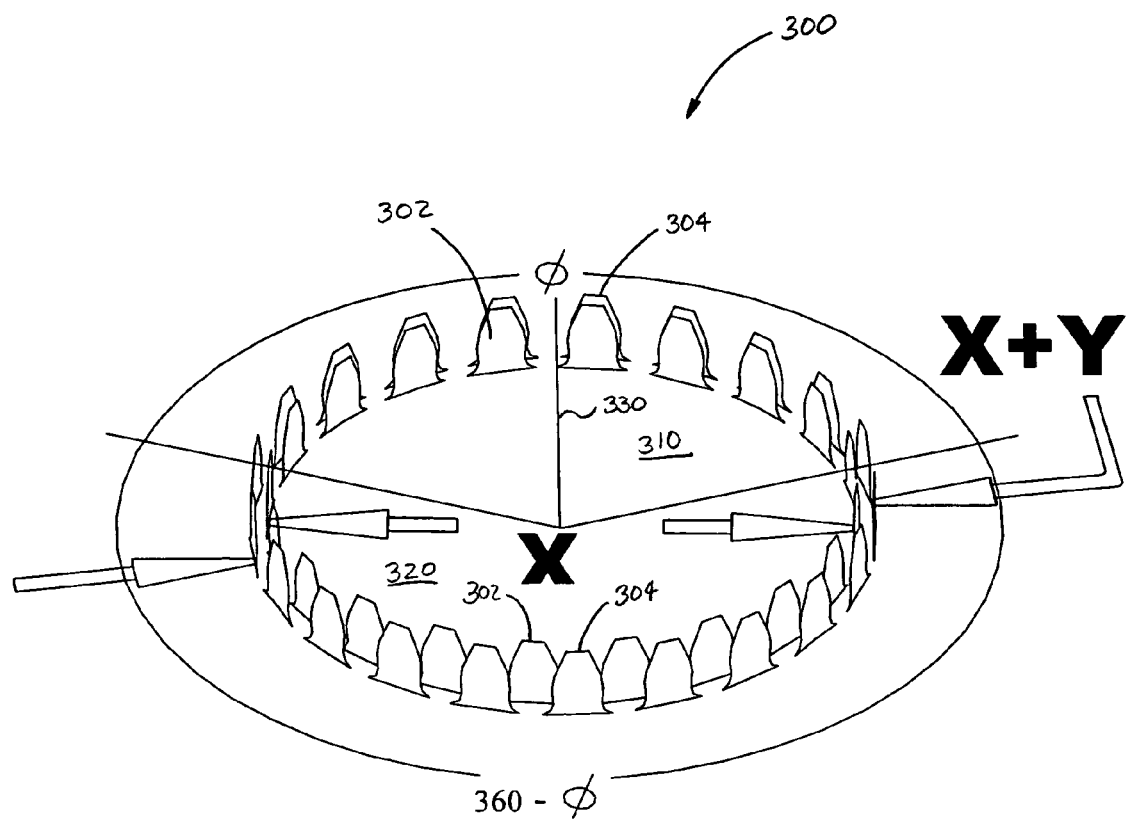

FIG. 3B illustrates a perspective diagram of the exemplary gear 300 having the inner set of circumferentially-arranged teeth 302 and an adjacent set of circumferentially-arranged teeth 304 in accordance with an embodiment of the invention. In this example, the adjacent set of circumferentially-arranged set of teeth 304 has a slightly larger diameter (X+Y). The diametral pitch of teeth set 304 should be approximately the same as the diametral pitch of teeth set 302. Accordingly, the following relationship holds:

$$\text{Diametral Pitch (teeth set 304)} \cong \frac{20}{X} \quad \text{Equation 4}$$

If Y is substantially small compared to X (i.e. Y<<X), then Equation 4 can be approximated as follows:

$$\text{Diametral Pitch (teeth set 304)} \cong \frac{20}{X+Y} \cong \frac{20}{X} \quad \text{Equation 5}$$

where the number of teeth for teeth set 304 may be 20 or a greater integer (e.g. 21).

As shown in FIG. 3B, the inner set of teeth 302 and the outer set of teeth 304 are arranged so that some of their respective teeth align in the radial direction, and as a consequence, others of their respective teeth do not align. Accordingly, the gear 300 includes a semi-annular section 310 extending an angular distance of φ about the rotational axis of the gear 300, where the teeth of sets 302 and 304 are aligned generally in the radial direction, and another semi-annular section 320 extending an angular distance of (360−φ) about the rotational axis of the gear 300, where teeth of sets 302 and 304 are not aligned generally in the radial direction. The aligned teeth of the semi-annular section 310 provide an engagement area substantially free from interference and backlashes.

Figure 3C:
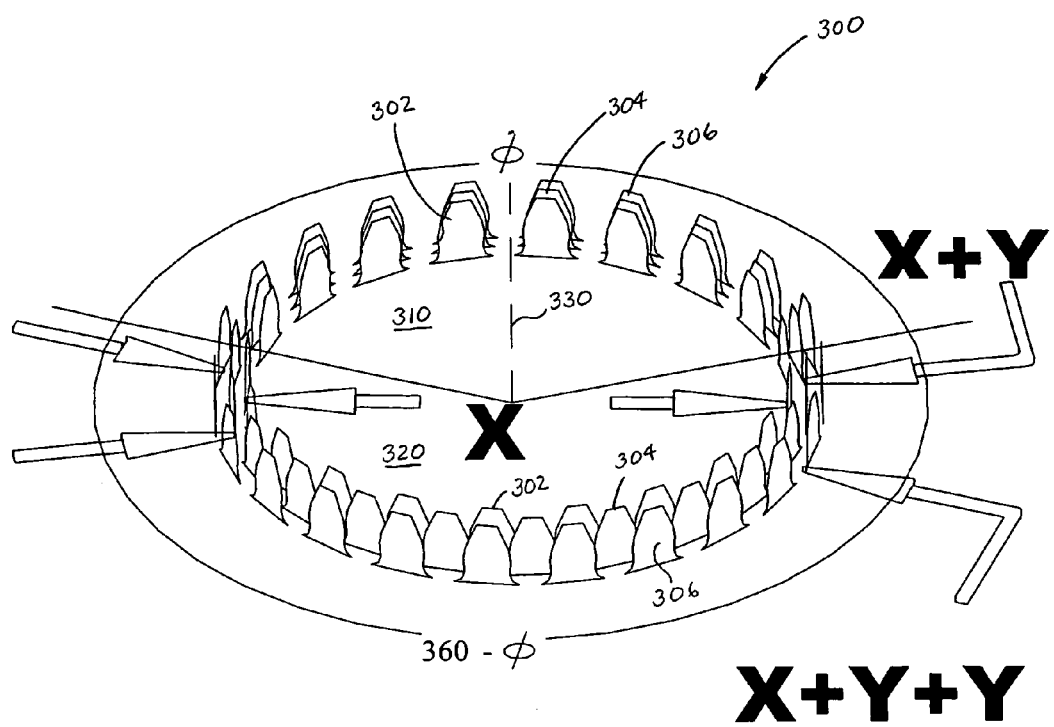

FIG. 3C illustrates a perspective diagram of the exemplary gear 300 having the inner set of circumferentially-arranged teeth 302, the middle set of circumferentially-arranged teeth 304, and an outer set of circumferentially-arranged teeth 306 in accordance with an embodiment of the invention. In this example, the outer set of circumferentially-arranged set of teeth 306 has a slightly larger diameter (X+Y+Y). The diametral pitch of teeth set 306 should be approximately the same as the diametral pitch of teeth set 304. Accordingly, the following relationship holds:

$$\text{Diametral Pitch (teeth set 306)} \cong \frac{20}{X+Y} \quad \text{Equation 6}$$

If Y is substantially small compared to X (i.e. Y<<X), then Equation 6 can be approximated as follows:

$$\text{Diametral Pitch (teeth set 304)} \cong \frac{20}{X+Y+Y} \cong \frac{20}{X+Y} \quad \text{Equation 7}$$

where the number of teeth for teeth set 306 may be 20 or a greater integer (e.g. 21).

As shown in FIG. 3C, the inner, middle and outer sets of teeth 302, 304 and 306 are arranged so that some of their respective teeth align in the radial direction, and as a consequence, others of their respective teeth do not align. Accordingly, the gear 300 includes a semi-annular section 310 extending an angular distance of φ about the rotational axis of the gear 300, where the teeth of sets 302, 304 and 306 are aligned generally in the radial direction, and a semi-annular section 320 extending an angular distance of (360–φ) about the rotational axis of the gear 300, where the teeth of sets 302, 304 and 306 are not aligned generally in the radial direction. The aligned teeth of the semi-annular section 310 provides the engagement area in which an engaging gear will have substantially no interference or backlashes.

Figure 3D:
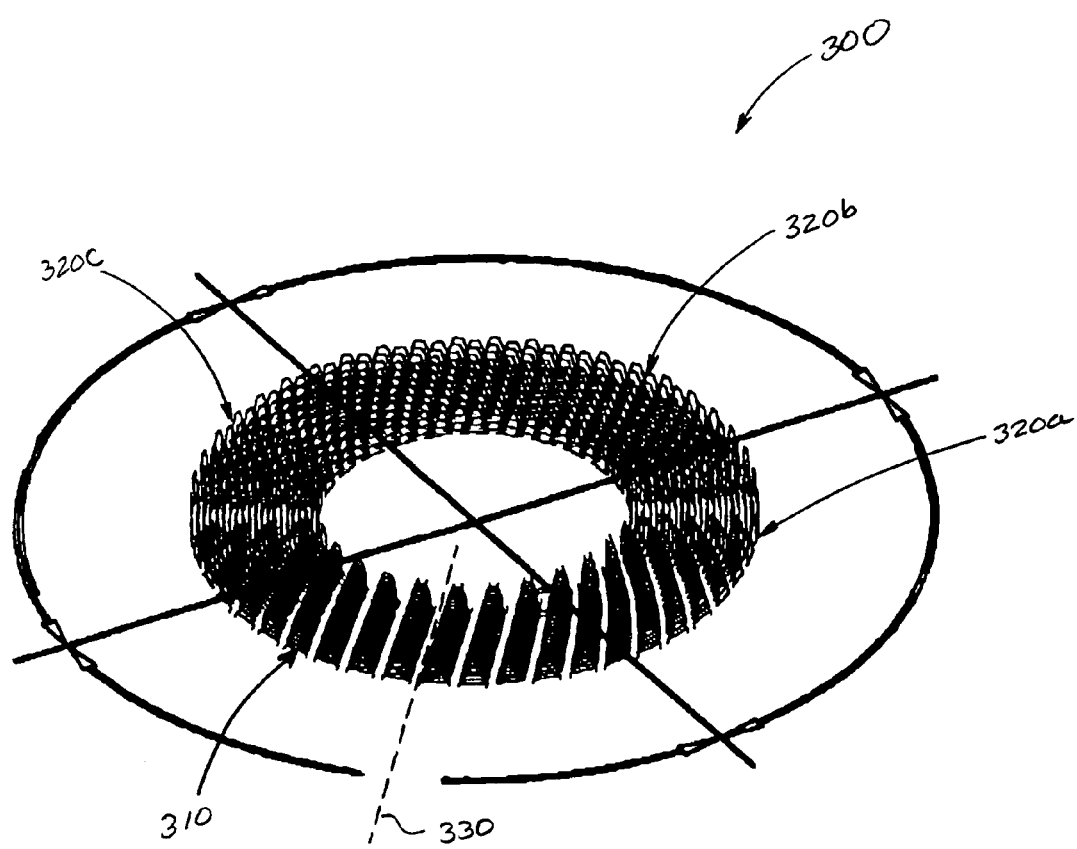

FIG. 3D illustrates a perspective diagram of the exemplary gear 300 having a plurality of adjacent sets of circumferentially-arranged teeth in accordance with an embodiment of the invention. The gear 300 includes the semi-annular section 310 having sets of circumferentially-arranged teeth aligned to define an engagement area in which an engaging gear will have substantially no interference or backlash. The other semi-annular sections 320a and 320c include sets of circumferentially-arranged teeth which are semi-aligned but not to the extent that a practical engagement area can be formed. And, the remaining semi-annular section 320b include sets of circumferentially-arranged teeth which are not aligned to form a viable engagement area. As illustrated in the following figures, a concept of the invention is to remove the non-aligned and semi-aligned angular sections 320a–c so that coupling to engaging gears occurs only by way of the aligned semi-annular section 310.

Figure 4:
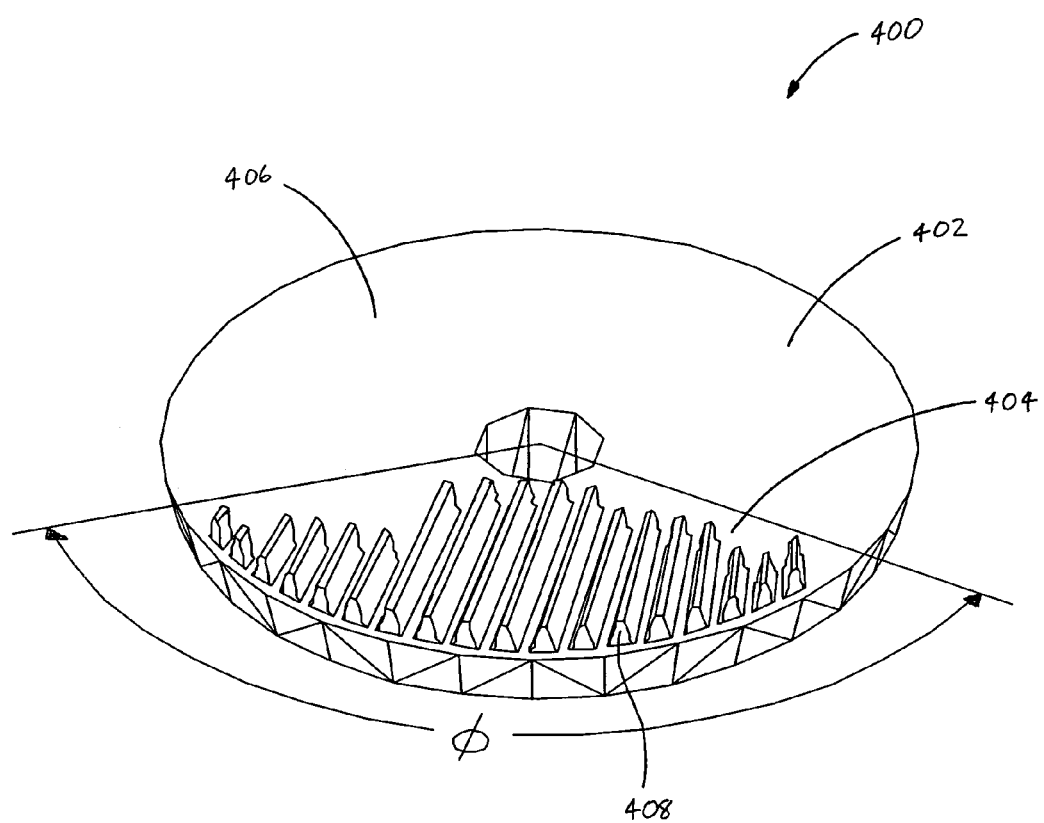
FIG. 4 illustrates a perspective view of an exemplary gear in accordance with another embodiment of the invention.

FIG. 4 illustrates a perspective view of an exemplary gear 400 in accordance with another embodiment of the invention. The gear 400 comprises a coupling side 402 for coupling to a plurality of engaging gears. The coupling side 402 of the gear 400 comprises an engaging semi-annular section 404 for engaging with the plurality of engaging gears, and a non-engaging semi-annular section 406 for not engaging with the plurality of the engaging gears.

The engaging semi-annular section 404 comprises a plurality of elongated teeth 408 to engage with corresponding teeth of the plurality of engaging gears. The teeth 408 are elongated generally in the radial direction of the gear 400 but can depart therefrom by a helix angle as is discussed later in the disclosure. The elongation of the teeth 408 in the general radial direction of the gear 400 provides an engagement area for the plurality of the engaging gears. In this example, the engaging semi-annular section 404 of the gear 400 extends an angular distance of φ about the rotational axis of the gear 400. It shall be understood that the engaging semi-annular section 400 may include different patterns of engaging structures, such as a spiral or hypoid pattern.

The non-engaging semi-annular region 406 does not have any teeth for coupling with the engaging gears. The non-engaging semi-annular section 406 could have teeth or other structures thereon, but recessed or configured not to engage with the plurality of engaging gear. The non-engaging semi-annular section 406 extends an angular distance of (360–φ) about the rotational axis of the gear 400. As is discussed further in the disclosure, a plurality of gears are used to engage with the engaging semi-annular section 404 in order to provide continuous rotational engagement.

Figure 5:
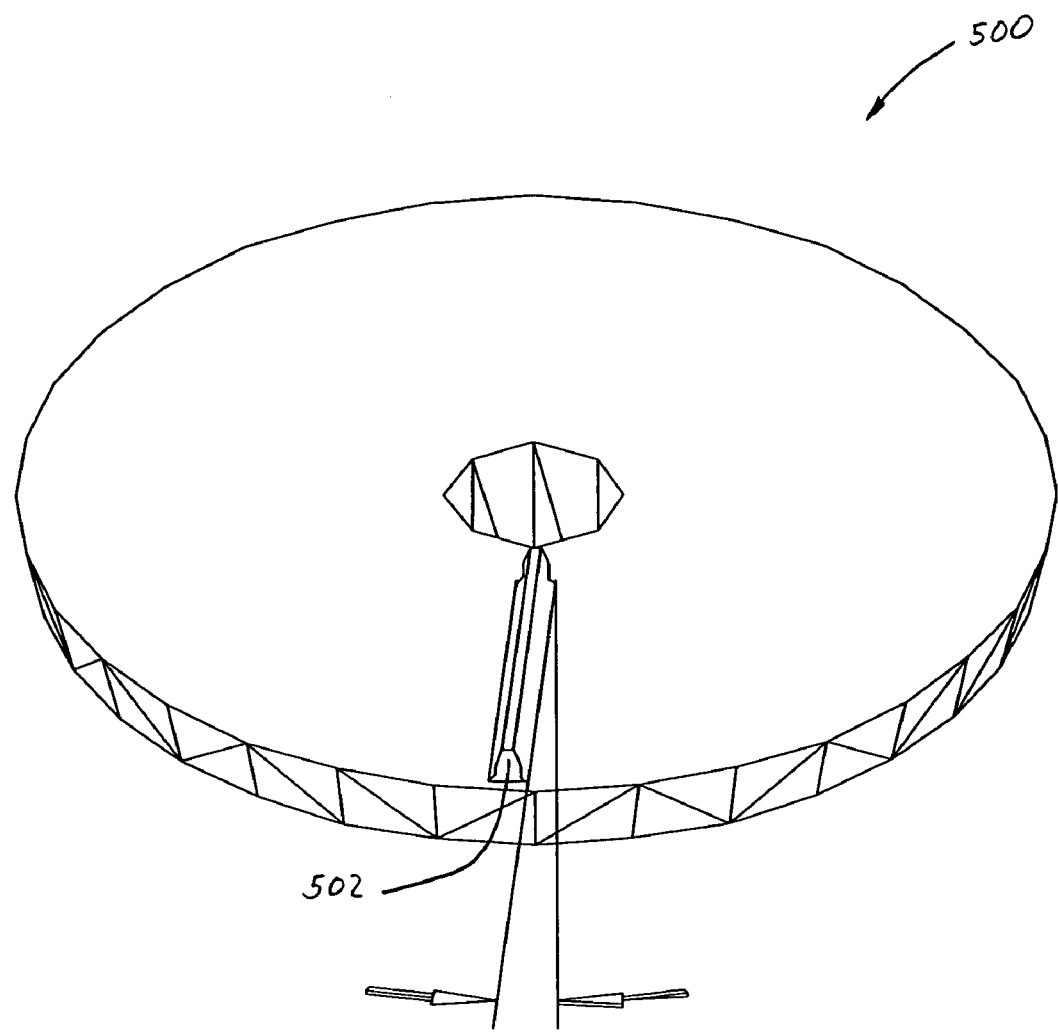
FIG. 5 illustrates a perspective view of an exemplary gear in accordance with another aspect of the invention.

FIG. 5 illustrates a perspective view of an exemplary gear 500 in accordance with another aspect of the invention. The gear 500 comprises a tooth 502 elongated generally in the radial direction. But more specific, the direction of elongation of the tooth 502 is skewed from the radial of the gear 500 by an angle termed in the art as the "helix angle." Accordingly, the gears described herein could have teeth elongated substantially in the radial direction, or skewed from the radial direction by the helix angle. The helix angle can be as high as 45 degrees.

Figure 6:
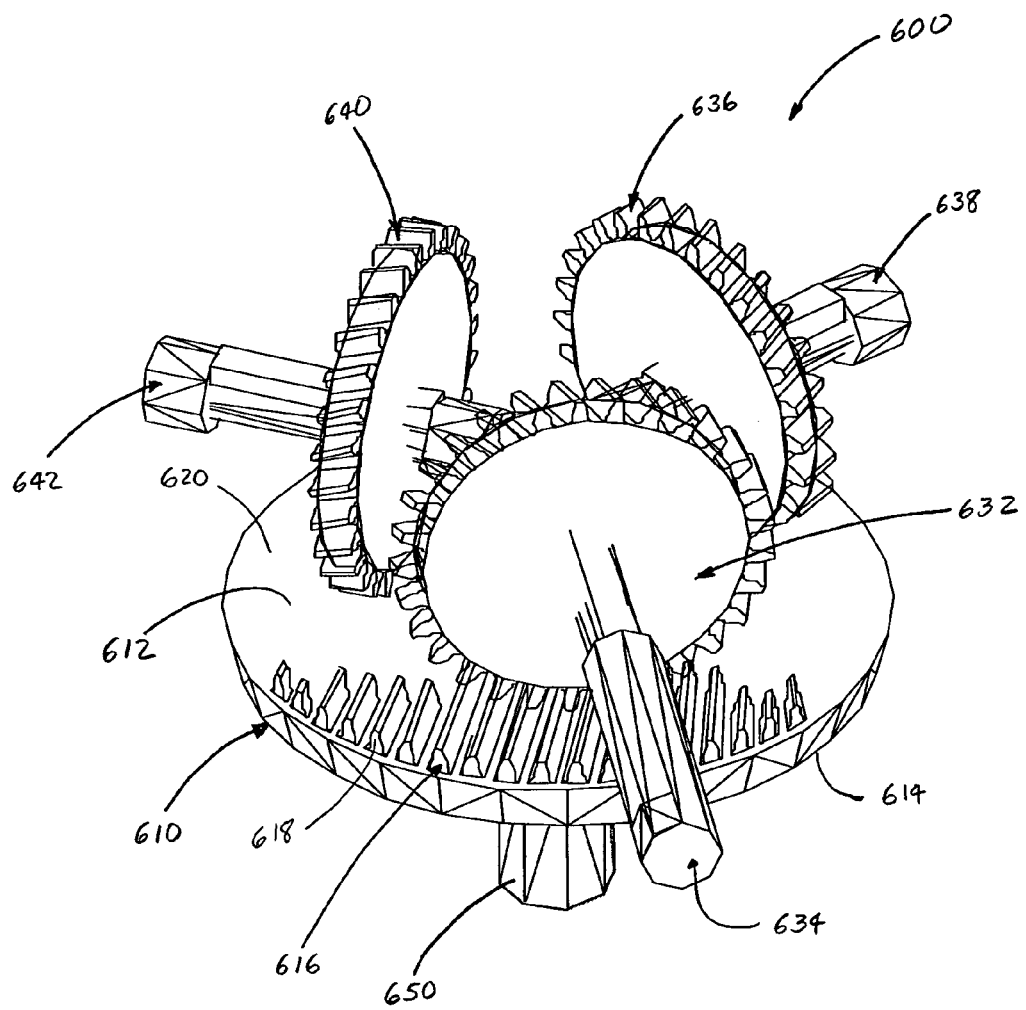
FIG. 6 illustrates a perspective view of an exemplary transmission system in accordance with another embodiment of the invention.

FIG. 6 illustrates a perspective view of an exemplary transmission system 600 in accordance with another embodiment of the invention. The transmission system 600 comprises a primary gear 610 including a first side 612 for coupling to a plurality of engaging gears 632, 636, and 640, and a second side 614 securely attached to a supporting shaft 650. As previously discussed, the primary gear 610 comprises an engaging semi-annular section 616 including a plurality of teeth 618 for engaging with corresponding teeth of the engaging gears 632, 636, and 640. The teeth 618 may be elongated substantially in the radial direction of the primary gear 610, or skewed therefrom by the helix angle as shown. On the coupling side 612, the primary gear 610 further comprises a non-engaging semi-annular section 620 that does not engage with the engaging gears 632, 636, and 640.

The engaging gears 632, 636, and 640 are supported respectively by shafts 634, 638, and 642. As is discussed in more detail below, the engaging gears 632, 636, and 640 are respectively supported by the shafts 634, 638, and 642 in a manner that they are rotationally coupled but can still move along the rotationally axes of the shafts 634, 638, and 642 to change the gear ratio. The rotational axes of the engaging gears 632, 636, and 640 may be substantially orthogonal to the rotational axis of the primary gear 610 as shown, but they need not be. The primary gear 610 could be driving the engaging gears 632, 636, and 640, or vice-versa. That is, at least one of the engaging gears 632, 636, and 640 may be driving the primary gear 610.

In operation, as the primary gear 610 rotates, at least one of the engaging gears 632, 636, and 640 may be engaged with the teeth 618 of the engaging semi-annular section 616 of the gear 610 at a particular angular orientation. Thus, during rotation of the primary gear 610, there is continuous rotational engagement of the primary gear 610 with at least one of the engaging gears 632, 636, and 640. Although in the exemplary embodiment there are three (3) engaging gears, 632, 636, and 640, it shall be understood that such a transmission system may include two or more engaging gears.

Figure 7A:
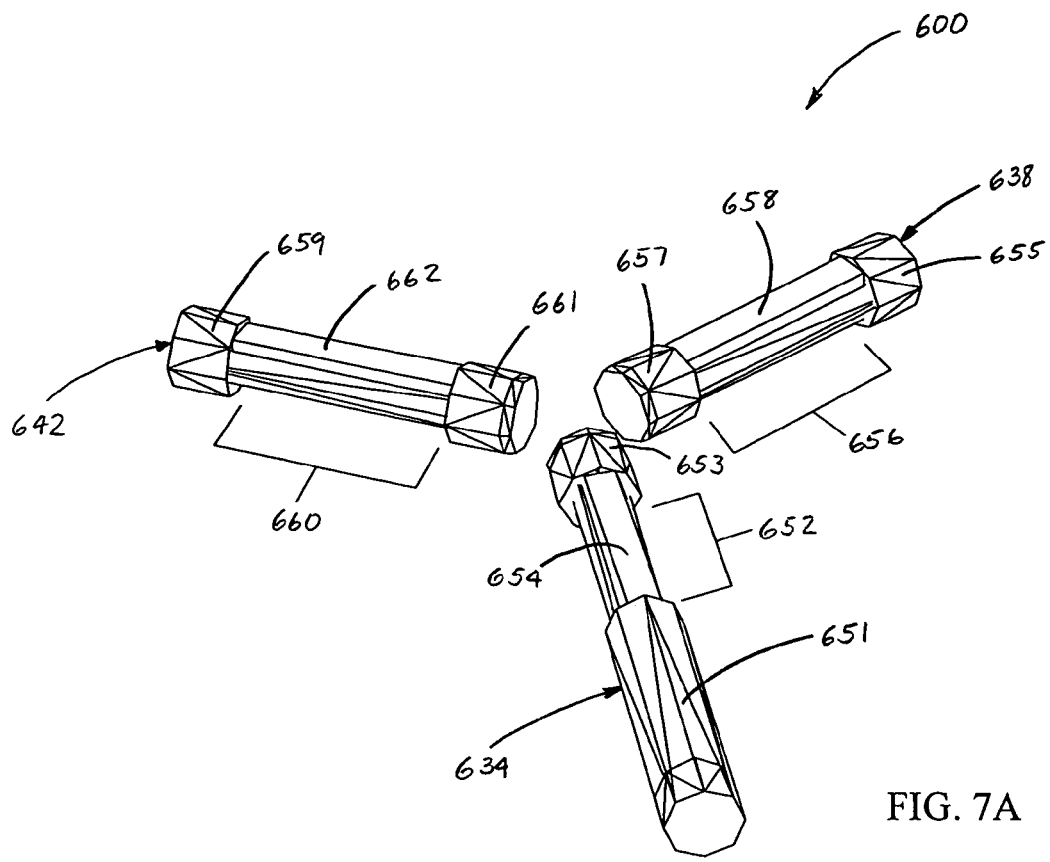
FIG. 7A illustrates a perspective view of an exemplary transmission system with shafts for supporting the engaging gears in accordance with another embodiment of the invention.

FIG. 7A illustrates a perspective view of the exemplary shafts 634, 638, and 642 in accordance with an embodiment of the invention. The shafts 634, 638, and 642 respectively comprise narrower diameter regions 652, 656, and 660 interposed between wider diameter regions (651, 653), (655, 657), and (659, 661). The narrower diameter regions 652, 656, and 660 respectively comprise key portions 654, 658, and 662 extending the lengths of the respective narrow diameter regions 652, 656, and 660.

Figure 7B:
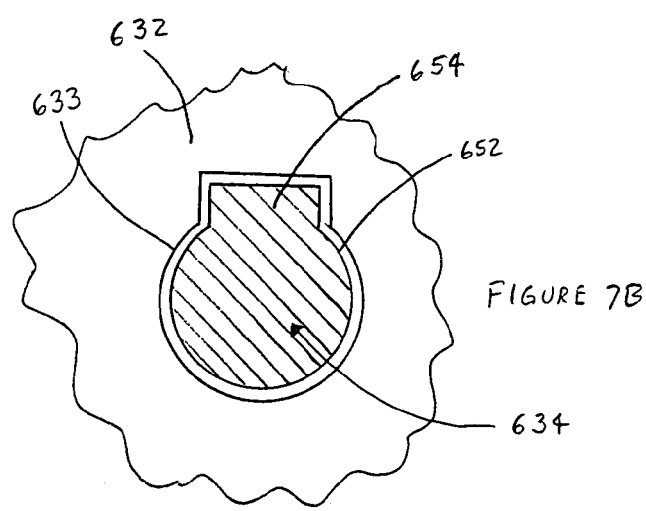
FIG. 7B illustrates a cross-sectional view of the exemplary coupling between an engaging gear and a supporting shaft in accordance with another embodiment of the invention.

As shown better in FIG. 7B, gear 632, representing the engaging gears, comprises an aperture 633 configured to register with the narrower diameter region 652 of the shaft 634. The key portion 654 provides rotational engagement between the gear 632 and the shaft 634. In addition, this registration of the gear aperture 633 to the narrow diameter region 652 of the shaft 634 allows the gear 632 to move along the longitudinal axis of the shaft 634 so that the gear ratio between the engaging gear 632 and the primary gear 610 may be changed. Referring back to FIG. 7A, the wider portions 651 and 653 of the shaft 634 functions as opposing stops for the axial-moving gear 632.

Figure 8:
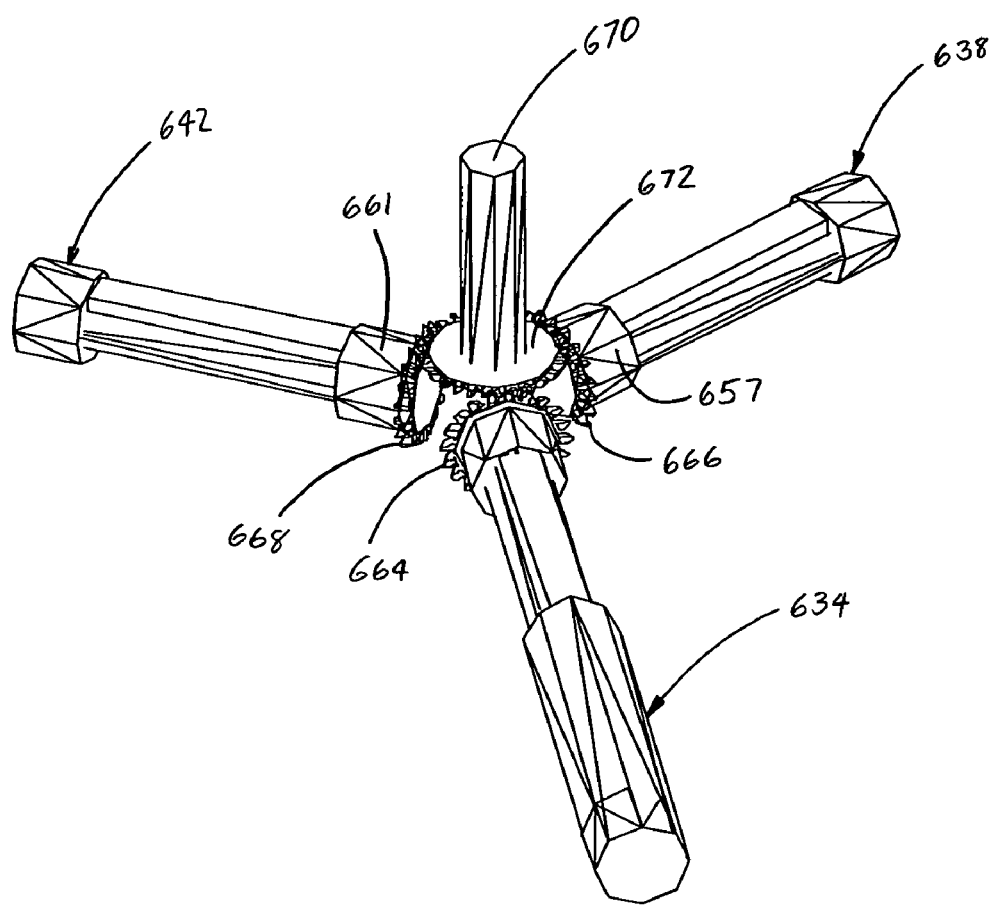
FIG. 8 illustrates a perspective view of an exemplary transmission system with the shafts that support the engaging gears coupled to another shaft by way of respective coupling gears in accordance with another embodiment of the invention.

FIG. 8 illustrates a perspective view of the exemplary shafts 634, 638, and 642 rotationally coupled to a secondary shaft 670 in accordance with another aspect of the invention.

As previously discussed, the primary shaft 650 and primary gear 610 are rotationally coupled to a subset of the engaging gears 632, 636, and 640 at a particular angular orientation. However, it may be desirable to rotationally couple the engaging gears 632, 636, and 640 collectively to a single rotational member. The exemplary transmission system 600 accomplishes this task by including a plurality of gears 664, 666, and 668 axially attached to the wider diameter portions 653, 657, and 661 of the respective shafts 634, 638, 642. The gears 664, 666, and 668 are rotationally coupled to a secondary gear 672 axially attached to a secondary shaft 670. Accordingly, at a particular angular orientation, the primary shaft 650 is rotationally coupled to the secondary shaft 670 by way of the primary gear 610, a subset (one or more) of the engaging gears 632, 636, and 640, a subset (one or more) of the gears 664, 666, and 668, and the secondary gear 672.

Figure 9:
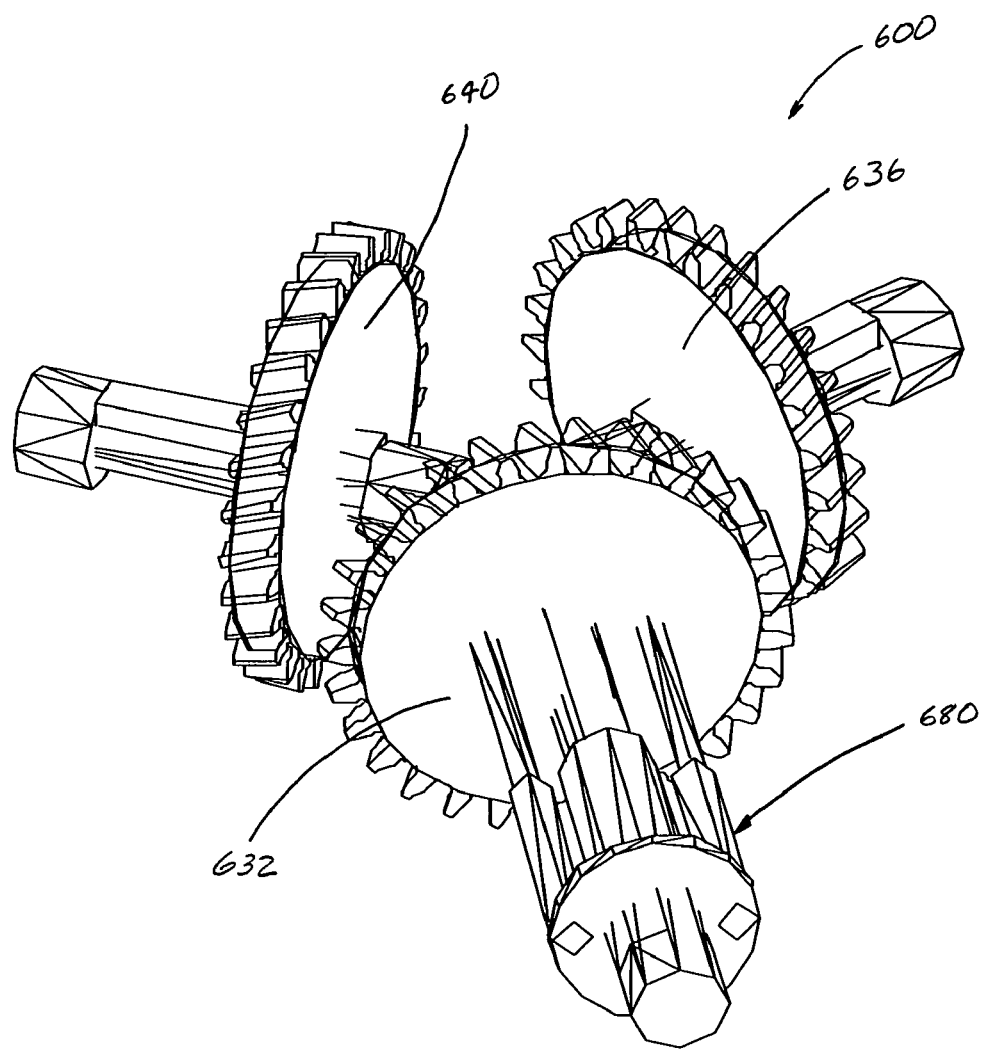
FIG. 9 illustrates a perspective view of an exemplary transmission system using a hydraulic device to move the engaging gears to different gear ratio positions in accordance with another embodiment of the invention.

FIG. 9 illustrates a perspective view of the exemplary transmission system 600 using a hydraulic device 680 to move the engaging gears to higher gear ratios in accordance with another embodiment of the invention. As the rotational speed of the primary gear 610 and the engaging gears 632, 636, and 640 increases, the engaging gears 632, 636, and 640 inherently move towards a lower gear ratio, where the rotational coupling is more efficient at higher speeds. However, as the rotational speed of the primary gear 610 and the engaging gears 632, 636, and 640 decreases, the engaging gears 632, 636, and 640 may not inherently move towards a higher gear ratio, where the rotational coupling is more efficient at lower speeds. Accordingly, the gear transmission system 600 comprises a device 680 to move the engaging gears 632, 636, and 640 towards higher gear ratios. The device 680 may be a hydraulic device, an electric motor, or other device that can responsively move the engaging gears 632, 636, and 640 towards higher (and possibly lower) gear ratios.

Figure 10:
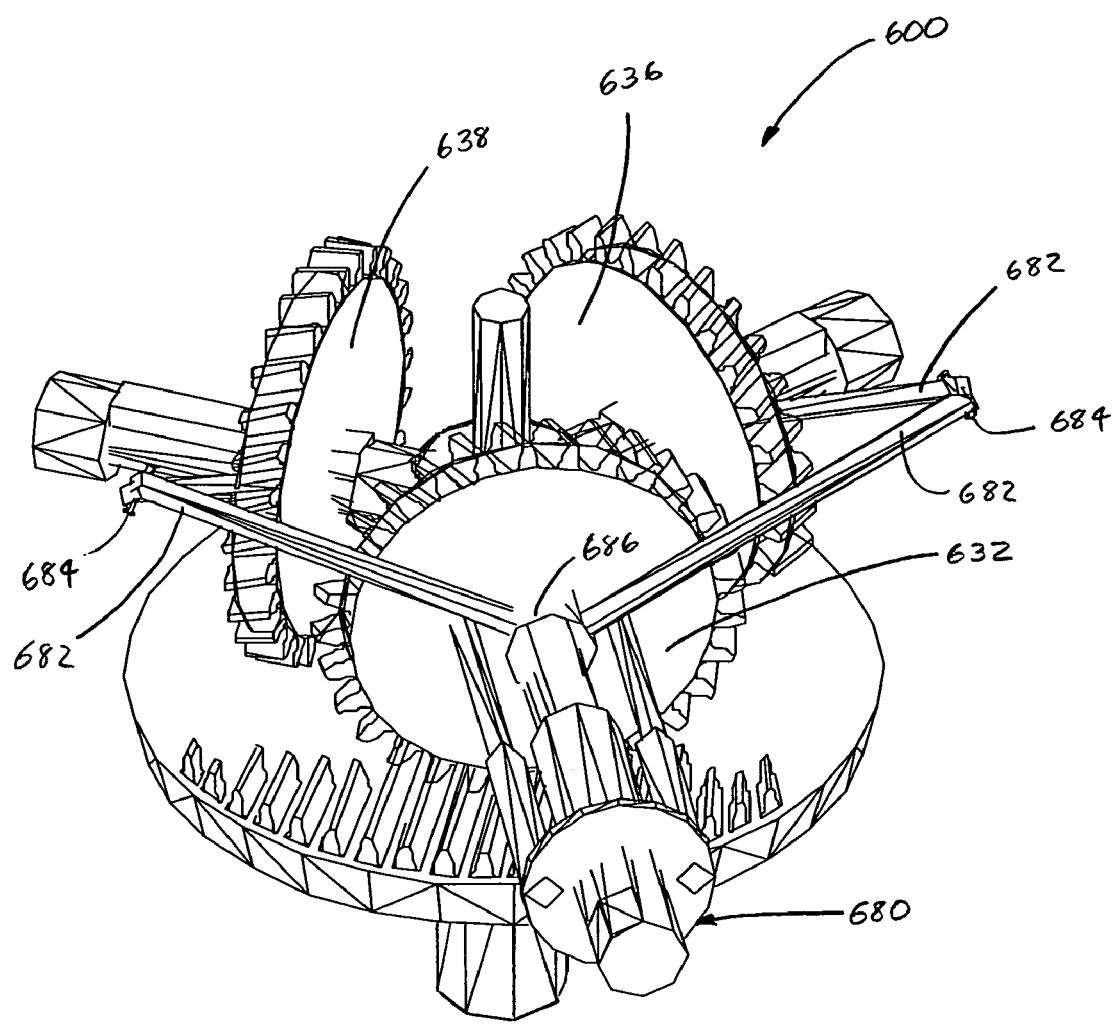
FIG. 10 illustrates a perspective view of an exemplary transmission system including a plurality of rods to maintain each of the engaging gears at substantially the same gear ratio in accordance with another embodiment of the invention.

FIG. 10 illustrates a perspective view of an exemplary transmission system 600 including a plurality of rods 682 to maintain each of the engaging gears at substantially the same gear ratio position in accordance with another embodiment of the invention. As previously discussed, the engaging gears 632, 636, and 640 may be moved between various gear ratio positions. It is desirable that each of the gears 632, 634, and 636 be at substantially the same gear ratio position. Accordingly, the transmission system 600 further comprises rods 682 coupled to the respective engaging gears 632, 636, and 640 by way of bearings 686, and coupled to each other by way of coupling pins 684. As one or more engaging gears 632, 636, and 640 moves to a different gear ratio position, the rods 682, mechanically coupled to all of the engaging gears 632, 636, and 640, ensure that the gears are at substantially the same gear ratio position.

Figure 11:
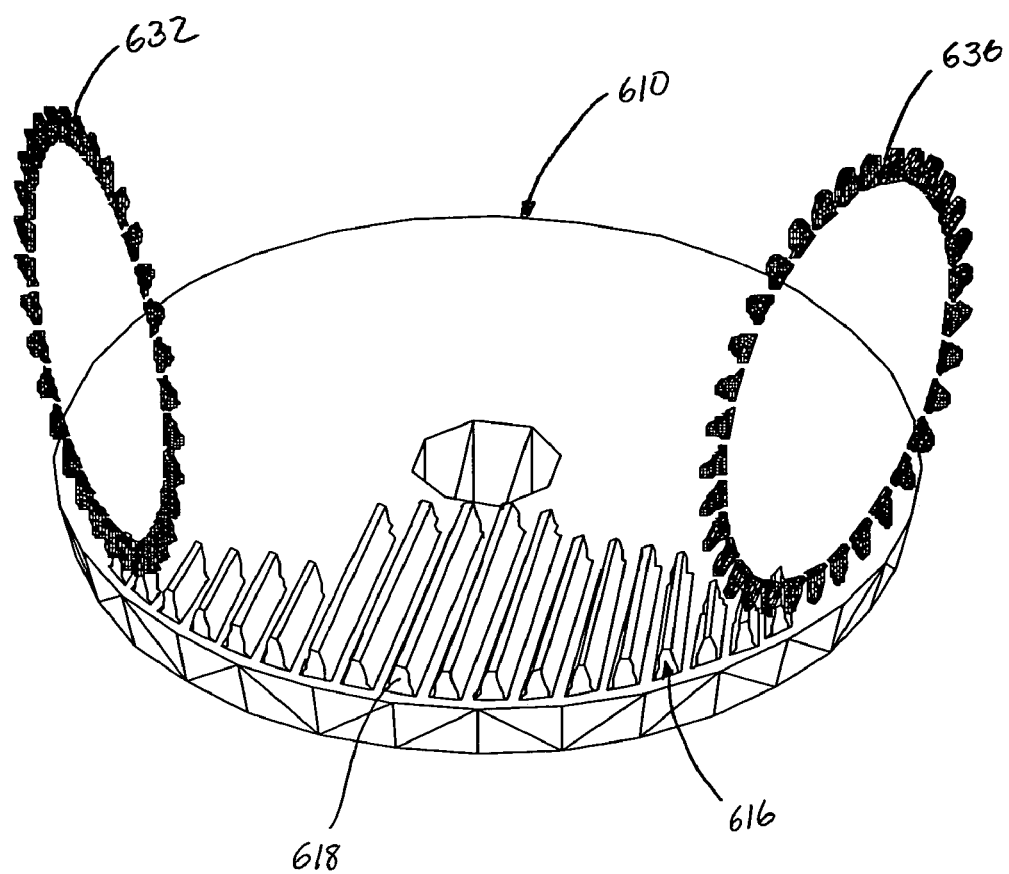
FIG. 11 illustrates a perspective view of an exemplary transmission system showing a position where the engaging gears can be moved to change the gear ratio in accordance with another embodiment of the invention.

FIG. 11 illustrates a perspective view of the exemplary transmission system 600 showing a position where the engaging gears may be moved to change the gear ratio in accordance with an embodiment of the invention. This example is especially applicable to non-straight or straight teeth elongated in a direction skewed from the radial of the gear 610 by the helix angle. The shafts 634, 638, and 642 supporting the engaging gears 632, 636, and 640 may be oriented in a direction substantially radial to the primary gear 610. Accordingly, the longitudinal orientation of the teeth differs from the longitudinal axis of the shaft (corresponding to the engaging gear situated within the engaging semi-annular section 616) by the helix angle.

As a result, when an engaging gear is within the engaging semi-annular section 616, it cannot move in the gear ratio changing direction. Therefore, in the case of teeth oriented in the helix angle, the engaging gears 632, 636, and 640 can move in the gear ratio changing direction at the ends of the engaging semi-annular section 616, as shown in FIG. 11. This requirement does not apply to the case where the longitudinal orientation of the teeth coincides with the radial direction of the gear 610. In such a case, the engaging gears 632, 636, and 640 may be moved in the gear ratio changing direction anywhere within or outside of the engaging semi-annular section 616 of the gear 610.

Figure 12:
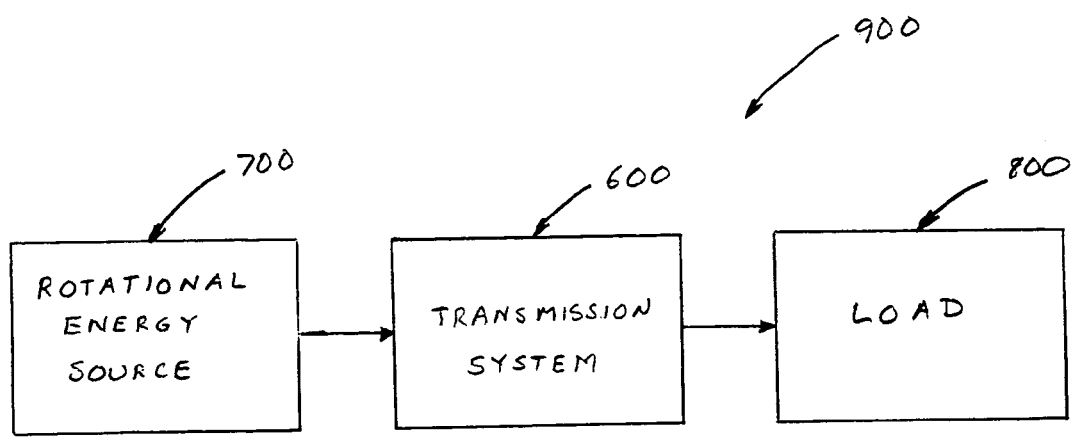
FIG. 12 illustrates a block diagram of an exemplary motion system in accordance with another embodiment of the invention.

FIG. 12 illustrates a block diagram of an exemplary motion system 900 in accordance with another embodiment of the invention. The exemplary transmission system 600 may be used in any motion system, such as those in vehicles, machinery, etc. Such a motion system 900 typically comprises a rotational energy source 700, such as an engine, motor, etc., coupled to the transmission system 600, which in turn, is coupled to a load 800.

In summary, the transmission system described herein has the advantages of providing no back lash, interference, and misalignment during shifting between various gear ratio positions. Further, although the exemplary embodiment of the invention has been described with reference to gears, it shall be understood that other types of engaging members may be used in place thereof, such as a sprocket.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It is claimed:

1. A transmission system, comprising:
   a primary engaging member comprising a first side having a single engaging section and a single non-engaging section; and
   a plurality of engaging members for rotationally engaging with said engaging section, wherein said engaging members are configured such that at least one of said engaging members is engaged to said engaging section of said primary engaging member at a particular angular orientation of said primary engaging member, and at least one of said engaging members is not engaged to said engaging section at said particular angular orientation of said primary engaging member.

2. The transmission system of claim 1, wherein said engaging section extends an angular distance of $\phi$, and said non-engaging section extends an angular distance of $(360-\phi)$.

3. The transmission system of claim 1, wherein said engaging section comprises a plurality of teeth.

4. The transmission system of claim 3, wherein said teeth are elongated.

5. The transmission system of claim 4, wherein a longitudinal direction of said elongated teeth substantially coincides with a radial direction of said primary engaging member.

6. The transmission system of claim 4, wherein a longitudinal direction of said elongated teeth is skewed from a radial direction of said primary engaging member by a helix angle.

7. The transmission system of claim 4, wherein said teeth are configured as a spiral or a hypoid.

8. The gear system of claim 1, wherein said engaging section comprises a gear ratio changing path.

9. The transmission system of claim 1, further comprising a shaft rotationally engaged with said primary engaging member.

10. The transmission system of claim 1, wherein respective rotational axes of said engaging gears are substantially orthogonal to a rotational axis of said primary engaging member.

11. The transmission system of claim 1, further comprising a plurality of shafts rotationally engaged with respective engaging members.

12. The transmission system of claim 11, wherein each of said shafts comprises a narrower diameter section interposed between two wider diameter sections, wherein said corresponding engaging member includes an aperture registered with said narrower diameter section, and wherein said corresponding engaging member is capable of moving along an axial direction of said narrow diameter section.

13. The transmission system of claim 12, wherein said narrower diameter section includes a key portion.

14. The transmission system of claim 12, wherein said two wider diameter sections function to stop said axial movement of said corresponding engaging member.

15. The transmission system of claim 12, further comprising a second set of engaging members rotationally engaged respectively with said shafts.

16. The transmission system of claim 15, further comprising a secondary gear rotationally engaged with said second set of engaging members.

17. The transmission system of claim 16, further comprising a second shaft rotationally engaged with said secondary engaging member.

18. The transmission system of claim 1, further comprising a device to move said engaging members in a manner that changes a gear ratio between said engaging members and said primary engaging member.

19. The transmission system of claim 18, wherein said device comprises a hydraulic device.

20. The transmission system of claim 18, wherein said device comprises an electric motor.

21. The transmission system of claim 18, wherein said device comprises a spring.

22. The transmission system of claim 18, wherein said device comprises a pneumatic device.

23. The transmission system of claim 1, further comprising a device to ensure said engaging members engage with said primary engaging member at substantially the same gear ratio position during movement of said engaging members along a gear ratio changing direction.

24. The transmission system of claim 23, wherein said device comprises a plurality of rods, wherein each of said rod includes a first portion pivotally coupled to a corresponding engaging member by way of a bearing, and a second portion pivotally coupled to an adjacent rod.

25. The transmission system of claim 1, wherein said primary engaging member comprises a gear.

26. The transmission system of claim 1, wherein said primary engaging member comprises a sprocket.

27. The transmission system of claim 1, wherein at least one of said engaging members comprises a gear.

28. The transmission system of claim 27, wherein at least one of said engaging members comprises a sprocket.

29. An engaging member comprising a side having a single engaging semi-annular section for engaging with a plurality of gears and a single non-engaging semi-annular section.

30. The engaging member of claim 29, wherein said engaging semi-annular section extends an angular distance of $\phi$, and said non-engaging semi-annular section extends an angular distance of $(360-\phi)$.

31. The engaging member of claim 29, wherein said engaging semi-annular section comprises a plurality of teeth.

32. The engaging member of claim 31, wherein said teeth are elongated.

33. The engaging member of claim 32, wherein a longitudinal direction of said elongated teeth substantially coincides with a radial direction of said engaging member.

34. The engaging member of claim 32, wherein a longitudinal direction of said elongated teeth is skewed from a radial direction of said engaging member by a helix angle.

35. The engaging member of claim 31, wherein said teeth are configured as a spiral or a hypoid.

36. The engaging member of claim 29, wherein said engaging semi-annular section comprises a gear ratio changing path.

37. A motion system, comprising:
    a rotational energy source;
    a transmission system coupled to said engine, wherein said transmission system comprises:
        a primary engaging member comprising a first side having a single engaging section and a single non-engaging section; and
        a plurality of engaging members for rotationally engaging with said engaging section, wherein said engaging members are configured such that at least one of said engaging members is engaged to said engaging section of said primary engaging member at a particular angular orientation of said primary engaging member, and at least one of said engaging gears is not engaged to said engaging section at said particular angular orientation of said primary engaging member; and
    a load coupled to said transmission system.

38. The transmission system of claim 1, wherein of said rotationally engaging of said plurality of engaging members with said single engaging section is substantially free from interference and backlashing.

39. The motion system of claim 37, wherein of said rotationally engaging of said plurality of engaging members with said single engaging section is substantially free from interference and backlashing.

40. A method of designing a gear, comprising:
    forming a plurality of first adjacent gear teeth circumferentially at a first radius from a center of said gear;
    forming a plurality of second adjacent gear teeth circumferentially at a second radius from said center of said gear, wherein said second radius is different than said first radius;
    substantially aligning in a radial direction a first portion of said plurality of first adjacent gear teeth with a corresponding first portion of said plurality of second adjacent gear teeth to form an engaging semi-annular section, wherein a remaining second portion of said plurality of first adjacent gear teeth not substantially aligned with a corresponding second portion of said plurality of second adjacent gear teeth forms a non-engaging semi-annular section; and
    removing said teeth of said plurality of first adjacent gear teeth and said plurality of second adjacent gear teeth within said non-engaging semi-annular from said gear.

* * * * *